United States Patent
Derakhshani et al.

(10) Patent No.: US 10,929,516 B2
(45) Date of Patent: Feb. 23, 2021

(54) DYNAMIC GRIP SIGNATURE FOR PERSONAL AUTHENTICATION

(71) Applicant: Advanced New Technologies Co., Ltd., George Town (KY)

(72) Inventors: Reza R. Derakhshani, Shawnee, KS (US); Stephanie Firehammer, Kansas City, MO (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/154,244

(22) Filed: Oct. 8, 2018

(65) Prior Publication Data

US 2020/0110861 A1    Apr. 9, 2020

(51) Int. Cl.
G06F 21/32 (2013.01)
G06K 9/00 (2006.01)
G06F 3/01 (2006.01)

(52) U.S. Cl.
CPC ............. G06F 21/32 (2013.01); G06F 3/016 (2013.01); G06K 9/00899 (2013.01)

(58) Field of Classification Search
CPC .............................. G06F 21/32; H04L 63/0861
See application file for complete search history.

(56) References Cited

U.S. PATENT DOCUMENTS

| | | | |
|---|---|---|---|
| 10,762,183 B1 | 9/2020 | Charan et al. | |
| 2002/0170220 A1* | 11/2002 | Recce | B60R 25/2045 42/70.08 |
| 2011/0271574 A1* | 11/2011 | Chang | F41A 19/58 42/70.06 |
| 2012/0028710 A1* | 2/2012 | Furukawa | G06F 21/32 463/37 |
| 2013/0214905 A1* | 8/2013 | Ota | G05B 1/01 340/5.81 |
| 2013/0283372 A1* | 10/2013 | Tsukamoto | H04L 9/3231 726/18 |
| 2014/0337948 A1 | 11/2014 | Hoyos | |
| 2015/0161368 A1* | 6/2015 | Stewart | G06F 21/32 726/19 |
| 2015/0161369 A1* | 6/2015 | Weksler | G06F 21/32 726/19 |
| 2015/0205944 A1 | 7/2015 | Turgeman | |
| 2017/0032114 A1 | 2/2017 | Turgeman | |
| 2017/0076132 A1* | 3/2017 | Sezan | G06K 9/00013 |
| 2017/0228527 A1* | 8/2017 | Schwarz | G06F 21/32 |
| 2018/0260553 A1 | 9/2018 | Hoyos et al. | |
| 2018/0276488 A1 | 9/2018 | Yoo et al. | |
| 2019/0057202 A1* | 2/2019 | Perez-Rovira | G06F 21/32 |
| 2019/0384898 A1* | 12/2019 | Chen | G06F 21/316 |
| 2020/0026830 A1 | 1/2020 | Alameh et al. | |

* cited by examiner

*Primary Examiner* — David J Pearson
(74) *Attorney, Agent, or Firm* — Fish & Richardson P.C.

(57) ABSTRACT

Methods, systems, and apparatus, including computer programs encoded on a computer storage medium, for a biometric authentication system. In one aspect, a method includes, a vibrating component of a mobile device is vibrated; a vibration signal of the mobile device is detected as a user grips the mobile device; a dynamic grip signature is determined for the user based on the detected vibration signal; and the user is authenticated based on a comparison of the dynamic grip signature to an initial grip template.

23 Claims, 5 Drawing Sheets

DYNAMIC GRIP SIGNATURE FOR PERSONAL AUTHENTICATION

BACKGROUND

Biometrics are physical characters that can be used as access keys to personalize applications and devices. Well-known biometric authentication and identification methods including using fingerprints, iris scans, facial recognition, voice characteristics, etc., can verify or identify a person. Biometric technology provides a more secure way to access online accounts or personal devices than the conventional password verification methods. Therefore, there has been a continuously increasing number of applications using biometric technology for user authentications.

SUMMARY

Implementations of the present disclosure are generally directed to pressure sensor devices employed within a biometric authentication system. More specifically, implementations are directed to detecting a vibration signal of a mobile device as a user grips the vibrating mobile device. A dynamic grip signature is determined for each user from the detected vibration signal. The dynamic grip signature is employed to authenticate the users to enable the user or services.

In a general implementation, a vibrating component of a mobile device is vibrated. A vibration signal of the mobile device is detected as a user grips the mobile device. A dynamic grip signature for the user is determined based on the detected vibration signal. The user is authenticated based on a comparison of the dynamic grip signature to an initial grip template.

The subject matter described in this specification can be implemented to realize one or more of the following advantages. First, the biometric information can be obtained by conventional equipment that is already included in mobile devices, so no additional component is needed. Second, the authentication process is simple and fast, and can be used for people with lesser technical experience. Third, the dynamic pressure signature also protects users of a biometric authentication system from spoofing.

It is appreciated that methods in accordance with the present disclosure can include any combination of the aspects and features described herein. That is, methods in accordance with the present disclosure are not limited to the combinations of aspects and features specifically described herein, but also may include any combination of the aspects, and features provided.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

Figure 1:
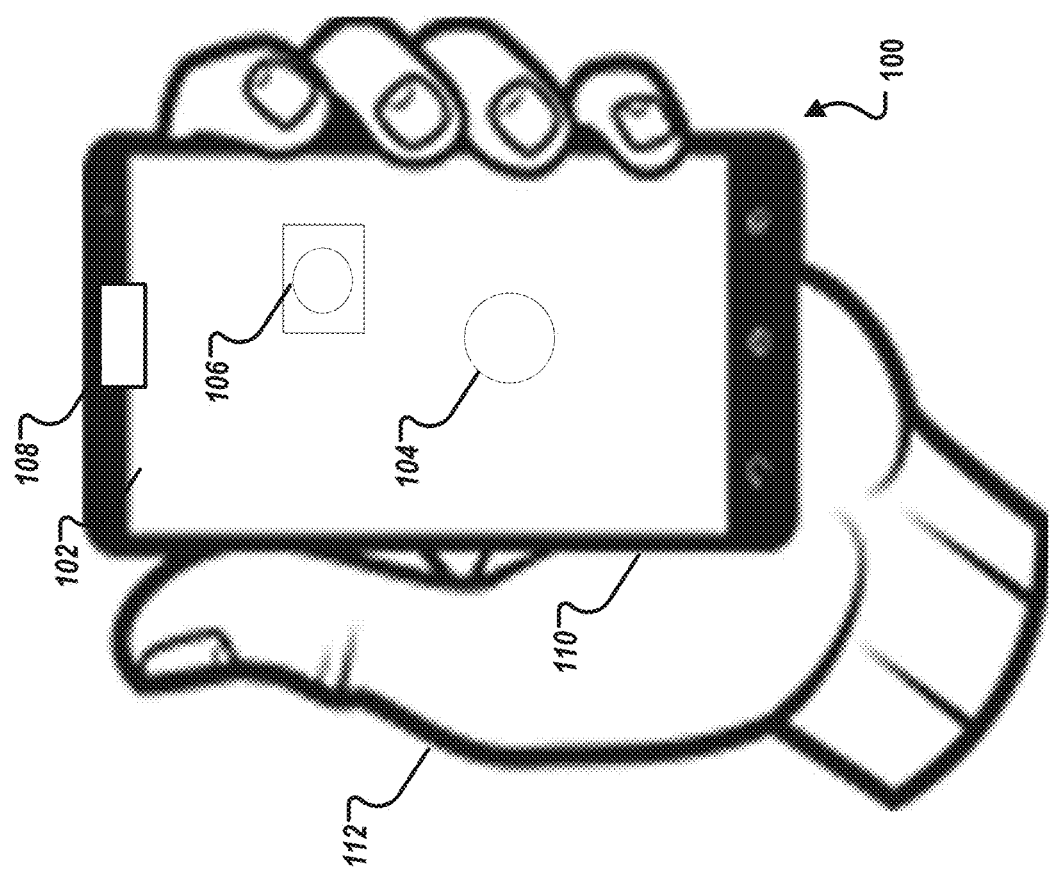
FIG. 1 is a mobile device used as an example environment to which a biometric authentication system may be deployed, according to some implementations of the present disclosure.

The following detailed description describes authenticating a user through soft biometric information and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted to not obscure one or more described implementations. The present disclosure is not intended to be limited to the described or illustrated implementations, but to be accorded the widest scope consistent with the described principles and features.

Biometric information is the characteristics of a person's body, such as fingerprints, facial patterns, hand geometry, iris scans, etc. Such information can be used to verify a person's identity by comparing their biometric data with the biometric data of a verified user. If the two sets of data are nearly identical, the person is verified and is typically granted access to a device. Compared to password authentication, biometric authentication provides an easier and more secure way for identity verification. For example, with the increasing development of modern smartphone technology, a smartphone can take less than a couple of seconds to verify a user by verifying their fingerprint or face. Although traditional biometrics are adaptable and accurate, sometimes the biometrics data is hard to obtain without using expensive equipment. In addition, biometrics such as fingerprints or retina patterns contain sensitive personal information that raises privacy concerns. As a result, users may be unwilling to adopt that technology. A compromised approach that can reduce these concerns is to authenticate users based on soft biometric information, which includes physical or behavioral attributes of a person, such as eye color, height, weight, tattoos, and other visible marks. While soft biometrics may not be accurate enough to identify a person, they can narrow the range of possibilities, resulting in a more secure, more convenient, and possibly faster and more flexible way to grant access to some functionality while denying access to functionality that is more sensitive. Soft biometrics can be used in conjunction with traditional biometrics to improve the accuracy of a biometric authentication process, or to add anti-spoofing/liveness checks. They can also be used in occasions where approximate identity detection is acceptable, such as enabling a user to see a bank balance while preventing access to transactions.

Hand function is the result of a sophisticated and versatile structural arrangement, in conjunction with an elaborate and fully automatic system of controls. Even for two people with similar hand size, the contours associated with their hands are different, for example, muscles on their hands may be pronounced in different areas. Further, palms of younger and more active people may be more defined and can produce a stronger grip. As will be explained in more details later, based on differences and variations associated with each individual hand, implementations described in this disclosure allow mobile devices to authenticate users (or differentiate between normal and spoofing grips) based on their response to vibration signals. That is, when different people grip the same vibrating device, the vibration signal may be affected in different ways, and such variations can be used as a soft biometric for authentication purposes.

The human hand-arm system is a complex mechanism that consists of bones, muscles, tissues, and skin. When a person holds a device, the hand and the device together constitute a specific mechanical system. In some implementations, the described biometric authentication system can measure the effect of such mechanical stimulus by capturing the dampening of a vibrating mobile device in response to a user's grip. For example, when a user holds a vibrating mobile device, such as a cell phone, given the unique biomechanical characteristics of each individual's grip, hand, arm, etc., the response recorded by the device sensor might be modulated in a person-specific way. Because the response to the vibration signal is measured by the motion sensors on the device, and the response would vary based on how a person grips the device, the measured signals vary from one person to another. Extracting the biometric information contained in the response from the motion sensor outputs and, characterizing the unique features of such response in a way to distinguish and classify inter- to intra-user variations (such as through system identification or other feature extraction techniques), should enable this concept to be used as a soft biometric modality. Essentially, the way a user's grip on the phone modulates the input vibration can be used as a soft signature for that particular user.

Another mode of operation is to detect the type of grip, rather than the user. One application is to detect the normal grip when a user is holding and looking at their phone in the usual manner, from that of a spoofer that, for instance, is holding the phone in front of a monitor to fool the biometric system.

In view of the foregoing, and as described in further detail herein, implementations of the present disclosure provide details for a biometric authentication system that can be deployed within a mobile device, such as a mobile phone. In particular, the person is authenticated based on the dampening of a vibrating mobile device based on a user's grip. Mobile devices, such as mobile phones, can provide notification through vibrations, which can create mechanical waves transferring the energy through the device's body. The range of vibration frequencies can extend up to 200 Hz or higher. Higher frequencies require higher acceleration to achieve the same perceived strength. Therefore, as the size of a mobile device decreases, smaller electric motors can achieve the same magnitude levels by spinning at a faster rate.

In some implementations, a baseline or template grip signature can be captured during a registration process. For example, a biometric authentication system may require registering users to grip a vibrating mobile device, such as a mobile phone, with embedded vibration sensors during a registration process to capture a bassline grip signature for each user. In some implementations, the grip signature captured during the registration process may be stored on a storage device accessible to the biometric authentication system. During run-time, a sample grip signature of a user can be captured and compared with the baseline dynamic grip signature and/or a template grip signature to determine if the user may be authenticated. In some implementations, a similarity score may be generated based on the comparison of the sample grip signature and the baseline grip signature.

FIG. 1 is a mobile device 100 used as an example environment to which a biometric authentication system may be deployed, according to some implementations of the present disclosure. Specifically, the mobile device 100 is configured to authenticate a user and grant the user access to a subset of functions of one or more applications installed on the mobile device 100.

The mobile device 100 includes one or more components that support a biometric authentication system. For example, the mobile device 100 can include a display 102, a motor 104, one or more vibration sensors 106, a camera 108, and a surface 110, where a hand 112 of a user makes contact. The display 102 may display information to the user. The display 102 may also be used by the user to interact with the mobile device 100. For example, the display 102 may be a touch screen type of device displaying a user interface (UI) through which the user can enter and receive data. For example, a user who requests to access a subset of functions of an application installed on the device can be instructed to grip the mobile device 100.

The motor 104 may be employed to generate vibrations in a predetermined way (for example, vibrating at a coded sequence of pulses) while the hand 112 grips the mobile device 100. For example, the motor 104 can be an electronic motor that creates mechanical waves transferring the energy through the mobile device 100's body. In a typical mobile phone, for instance, the range of vibration frequencies can extend up to 200 Hz or higher. Higher frequencies require higher acceleration to achieve the same perceived strength. Therefore, as the size of a mobile device decreases, smaller motors can achieve the same magnitude levels by spinning at a faster rate.

The vibration sensors 106 detect vibrations received at the sensors and can be employed by the biometric authentication system to generate a dynamic grip signature for the user. In some implementations, the vibration sensors 106 can be an accelerometer, for example, a piezoelectric accelerometer that measures the dynamic acceleration of the mobile device 100. A piezoelectric accelerometer can produce a vibration signal of voltage as a function of time. The vibration sensors 106 can also be a gyroscope that determines the orientation of the mobile device 100. Paring together the accelerometer and the gyroscope can form a full 6-degree freedom sensor system. The vibration sensors 106 can detect the vibrations and convert them to digital signals.

When the vibrations generated from the motor 104 hit the contacting areas of the surface 110 where the hand 112 makes contact, part of the vibrations reflect the surface 110, and the rest propagates into the hand 112. In other words, the rest of the vibrations are absorbed by the skin, tissue, and muscles of the hand 112, and then bounce back to the surface 110 along a different propagation path. The vibrations that bounce back are affected (for example, damped) by the pressure imposed by the hand, and traverse different paths before reaching the vibration sensors 106. As such, biometric information of the hand 112, such as gripping strength and gripping positions, is embedded in the various interference vibrations captured at the vibration sensors 106. Such information can be captured by analyzing the received vibrations, and utilized as a biometric-associated feature in the system of this implementation.

In some implementations, the vibrations captured using the vibration sensors 106 can be processed by the biometric authentication system to identify/authenticate the user. Though the vibration signals are affected by simple gestures (e.g., grip), these gestures are associated with the user's unique behavior and physiological characteristics and can be used for authentication purposes in this disclosure. For example, a person with a larger palm area will likely place more pressure on the device where the person's palm area contacts the device. Similarly, a person with long fingers may wrap his fingers further around the device than a person with shorter fingers, increasing the size of contact areas between the hand and the device. The strength of the grip can also affect how much the initially generated vibration signals (that is, vibration signals generated before the user gripped the device) will be damped by the grip. In other words, a grip signature is determined largely by the physical attributes of a person's hands. Additionally, the dampening (i.e. reduction/absorption of the registered vibrational amplitude) is different at different vibrational frequencies, and thus an amplitude-frequency signature per user or grip-style may be developed when the device's haptic actuator sweeps through different excitation frequencies. Therefore, in some implementations, the biometric authentication system may extract from the vibration's various features, such as frequencies, peak-to-peak value, and so forth, to generate a dynamic grip signature for the particular user. In some implementations, the extracted features can be further processed by various techniques, such as Fourier transform to get better results.

The camera 108 can be employed to capture images of, for example, the vibrations of the mobile device 100 while the hand 112 is interacting with the mobile device 100. In some implementations, the vibration sensors 106 and the captured vibration signal data may be employed in conjunction with the camera 108 by the respective biometric authentication system deployed in the mobile device 100. For example, the vibrations of the mobile device 100 can further be detected via distortions induced in the images taken either by back facing or front facing cameras during the activation of the device's vibration motor. Features include onset, frequency, and amplitude of pixel shifts/motion blur within and across multiple frames and rolling shutter distortions. The biometric authentication system may use this information to determine whether the type of grip perceived by the camera originated from an authenticated user or from a spoofer. The captured vibration data can also be used in image analysis. For example, the biometric authentication system may measure the induced vibrations in terms of intensity and, to some extent, direction using the resulting motion blur or rolling shutter distortions. In some implementations, such vibration data can be checked against information included in the user's enrollment templates to detect foul play such as spoof attacks, where for instance the attacker may be holding the mobile device in front of a monitor and thus triggering a mismatch between the detected grip style and the normal grip style of that user.

The biometric authentication system then uses the generated dynamic grip signature to identify/authenticate a particular user by comparing the generated dynamic grip signature with an initial grip template of that particular user. The initial grip template is generated for the user during an enrollment process. In some implementations, the initial grip template can be stored at the mobile device. In some implementations, the initial grip template can be stored at a remote database. Because it is unlikely that a user can grip the device in exactly the same manner each time he picks up the device, in some implementations, during the enrollment process, the authorized user may be asked to grip the device multiple times. In some implementations, other techniques, such as pattern recognition, can be used to select features contained in the vibration signals that are more distinct between classes (that is, different users gripping the same device or users gripping the device in normal vs. spoofing positions), and consistent within a class (that is, the same user gripping the device multiple times using normal grip, or different users gripping the device in normal vs. spoofing positions). This is because some extracted features are not unique enough to discriminate different grips and to distinguish different users when they grip the same device.

In some implementations, the biometric authentication system may use a machine-learning process (e.g., a deep learning process implemented using a deep neural network architecture such as LSTM) to match the user to his or her stored initial grip template. In some implementations, the mobile device 100 may communicate with one or more remote processing devices (e.g., one or more remote servers) that implement the machine learning process (see FIG. 2).

Figure 2:
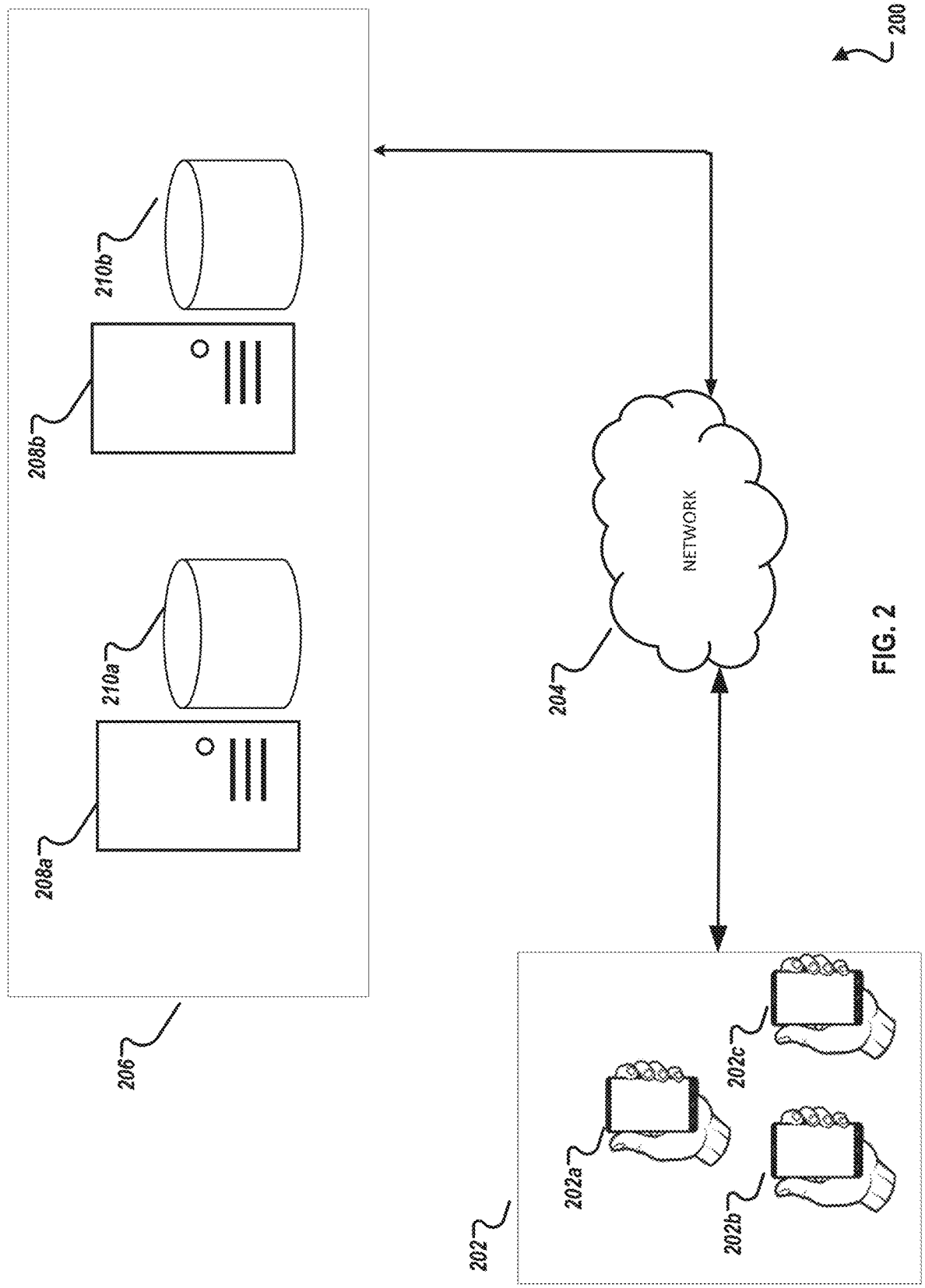
FIG. 2 is an example environment for executing a biometric authentication system deployed on a mobile device, according to some implementations of the present disclosure.

The biometric authentication system included in the mobile device 100 may be used for various purposes that require authenticating users via one or more biometric authentication processes. For example, the biometric authentication system can work through an application that allows a user to view the balance of their online banking account. In another example, the biometric authentication system can work through an application that allows a user to view an online order made at a website FIG. 2 is an example environment for executing a biometric authentication system deployed on a mobile device, according to some implementations of the present disclosure. The example environment 200 includes one or more mobile devices 202, a network 204, and a back-end system 206. The mobile devices 202 are substantially similar to the mobile device 100 of FIG.

In some implementations, the network 204 includes a local area network (LAN), wide area network (WAN), the Internet, or a combination thereof, and connects mobile devices (e.g., the mobile devices 202) and the back-end system (e.g., the back-end system 206). In some implementations, the network 204 can be accessed over a wired and/or wireless communications link. In some implementations, the network 204 includes a cellular network.

In the depicted example, the back-end system 206 includes one or more remote server systems 208a and 208b (hereinafter as "remote server system 208") and remote data repositories 210a and 210b (hereinafter as "remote data repository 210"). In some implementations, the back-end system 206 provides access to one or more computer-implemented services with which the mobile device 202 may interact. The computer-implemented services may be hosted on, for example, the remote server system 208 and the remote data repository 210. The computer-implemented services may include, for example, an authentication service that may be used by the mobile device 202 to authenticate a user based on a collected grip signature.

Within the back-end system 206, the remote server system 208 is connected to the remote data repository 210. In some implementations, the remote data repository 210 can be associated with the manufacturer of the mobile device 202 (such as iPhone®, Samsung®, Huawei®, etc.). In some implementations, the remote data repository 210 can be associated with a third-party provider of mobile applications that may be downloaded and installed on the mobile device 202. The remote data repository 210 (e.g., a server, a database) stores initial grip templates with each user. Each initial grip template is, for example, device-based, that is, a user can have multiple initial grip templates stored in the remote data repository 210. In some implementations, each initial grip template is associated with a different type of device.

In some implementations, the back-end system 206 includes computer systems employing clustered computers and components to act as a single pool of seamless resources when accessed through the network 204. For example, such implementations may be used in a data center, cloud computing, storage area network (SAN), and network attached storage (NAS) applications. In some implementations, the back-end system 206 is deployed and provides computer-implemented services through a virtual machine(s).

Figure 3:
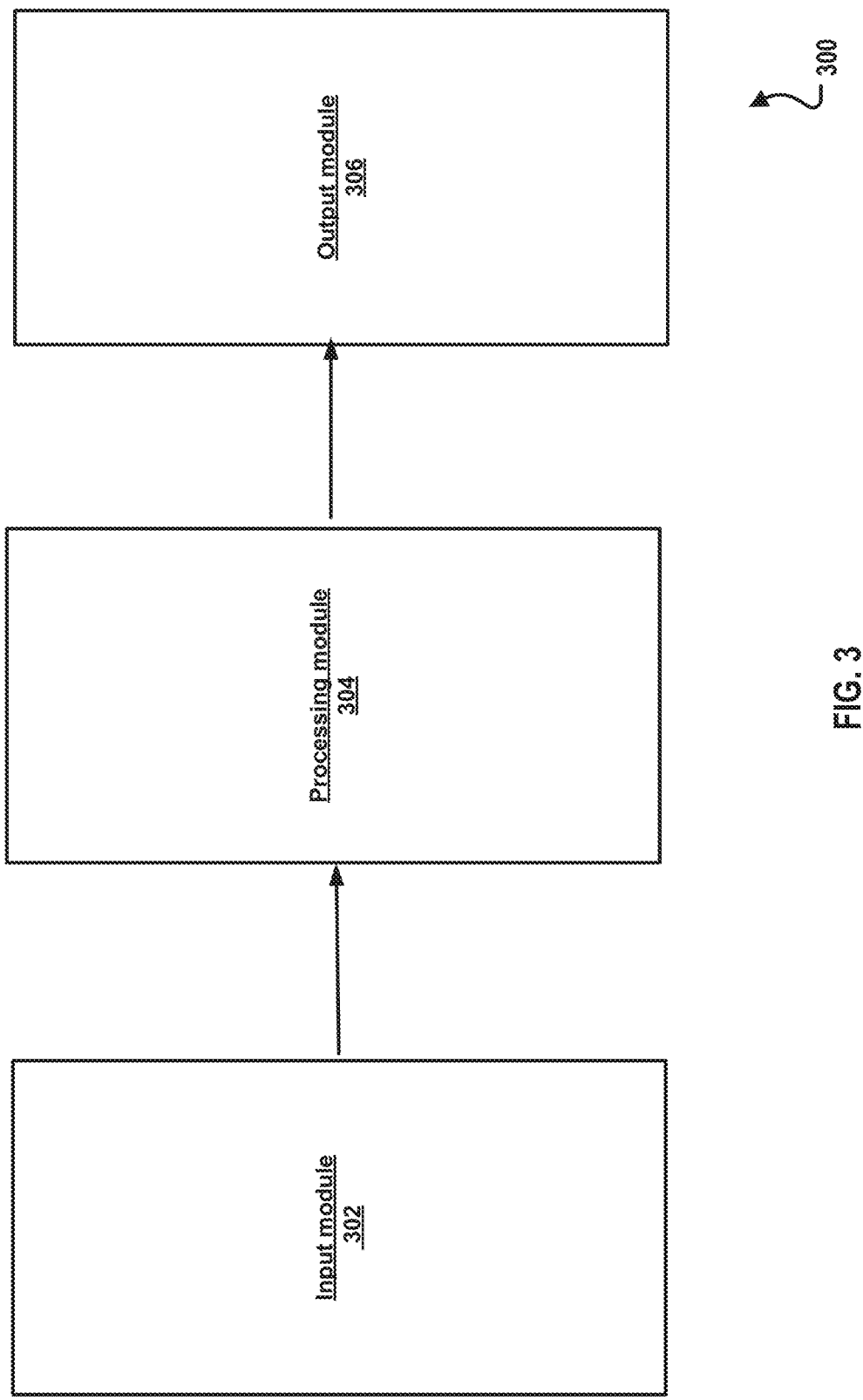
FIG. 3 is an example system for executing a biometric authentication system deployed on a mobile device, according to some implementations of the present disclosure.

FIG. 3 is an example system 300 for executing a biometric authentication system deployed on a mobile device, according to some implementations of the present disclosure. The system 300 includes an input module 302, a processing module 304, and an output module 306. In some implementations, the system 300 may be included within a mobile device, such as described in reference to FIG. 1. The output module 306 can be the display 102 that is disposed on a mobile device, such as a smartphone, tablet computer, or an e-reader.

The input module 302 detects damped vibrations as grip forces apply to a vibrating mobile device, and converts the detected vibrations to vibration signals and generates a dynamic grip signature. In some implementations, the vibration is detected while a user grips a vibrating mobile device that comprises the input module 302. The input module 302 can be considered as a linear system, or a non-linear system. The input to the system is the vibration signal measured by the motion or imaging sensors in the device. The measured vibration signals vary based on how a user grips the mobile device, and therefore vary from one user to another, or from one grip style to another (e.g. for spoofing detection). The output of the system is a dynamic grip signal based on the vibration signal.

Outputs from the input module 302 can be processed through the processing module 304. The processing module 304 can be configured to process the outputs from the input module 302 in various ways. In some implementations, one or more processors of the processing module 304 are configured to compare the input dynamic grip signature with an initial grip template to generate an authentication result. The initial grip template for a user is generated during an enrollment process. Because it is unlikely that the received dynamic grip signature will exactly match the initial grip template, in some implementations, a user is considered successfully authenticated (or the attempt is considered normal as opposed to spoofing) if the vibration signals contained in the dynamic grip signature matches a predetermined range of the plurality of predefined vibration signals contained in the initial grip template. Once the processing module 304 makes the determination as to whether the user is successfully authenticated (or the grip is detected as normal vs. that of a spoofer), the authentication result can be output and displayed on the output module 306.

Figure 4:
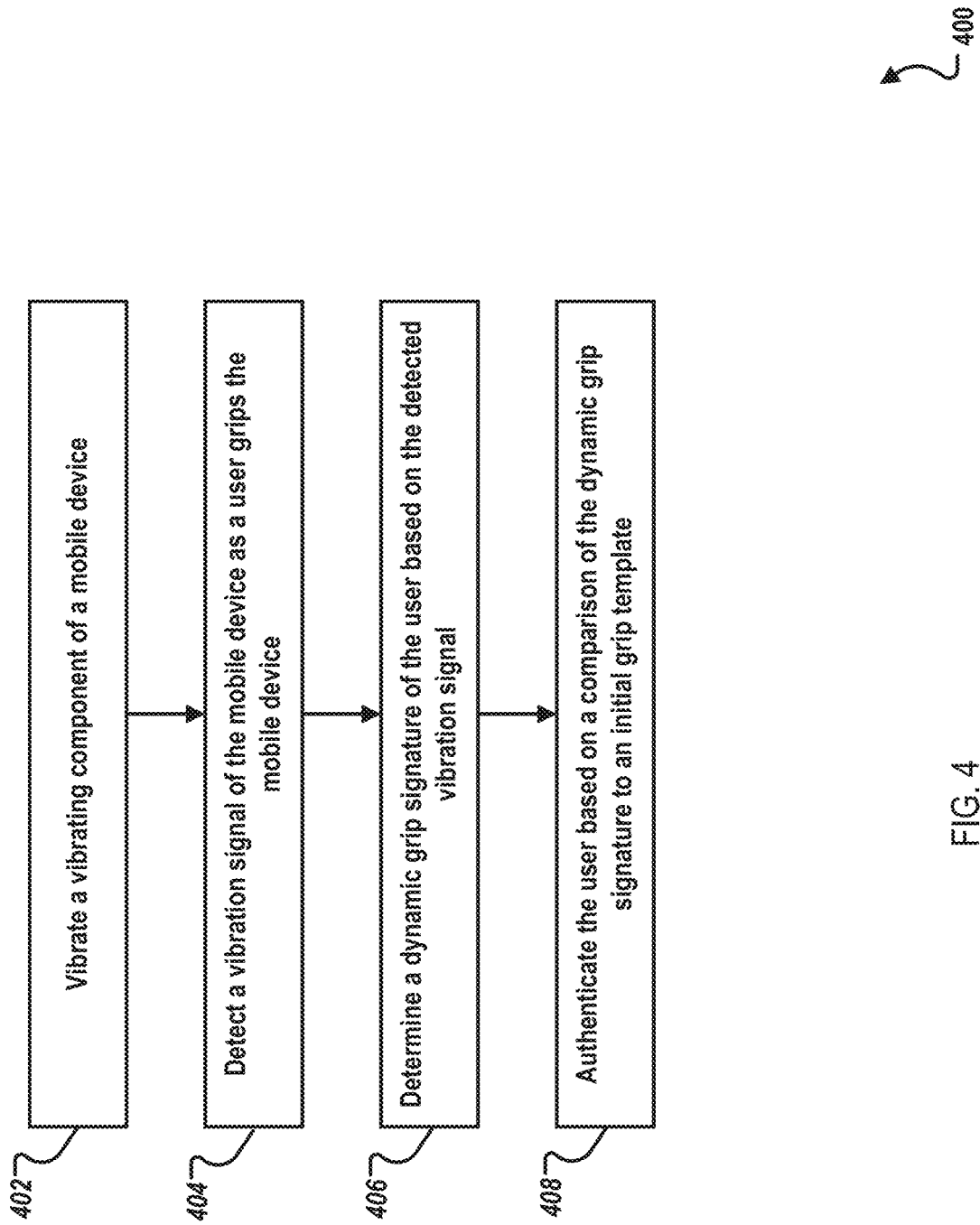
FIG. 4 is a flowchart illustrating an example method for a biometric authentication system deployed on a mobile device, according to some implementations of the present disclosure.

FIG. 4 is a flowchart illustrating an example method 400 for a biometric authentication system deployed on a mobile device, according to some implementations of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a vibrating component of the mobile device is vibrated. In some implementations, the vibrating component of the mobile device is vibrated by a motor of the mobile device in a predetermined way. In some implementations, the predetermined way can be a code sequence of pulses. From 402, the method 400 proceeds to 404.

At 404, a vibration signal of the mobile device is detected as a user grips the mobile device. In some implementations, vibration sensors such as the accelerometer and the gyroscope of the mobile device, can detect the vibrations generated from the mobile device. The sensors can act as converters that measure a physical quantity of the vibration and convert the vibration into a series of signals that can be read by an observer or by an instrument. In some implementations, device cameras can be used to further measure the induced vibrations in terms of intensity and to some extent direction using the resulting motion blur or rolling shutter distortions. In some implementations, images of the mobile device are captured with a camera, and vibrations of the mobile device are determined based on distortions of the images. In such implementations, the user is authenticated based on a comparison of the images of the mobile device to initial images of the mobile device captured during the enrollment process. From 404, the method 400 proceeds to 406.

At 406, a dynamic grip signature for the user is determined based on the detected vibration signal. In some implementations, the dynamic grip signature is associated with biomechanical properties of a hand-arm system of the user. In some implementations, the biomechanical properties of the hand-arm system of the user includes at least one of which hands of the user first touches the mobile device as the user grips the mobile device, a plurality of points of impact on a hand of the user as the user grips, the progression of grip force points as the user grips, and grip patterns of the user. From 406, the method 400 proceeds to 408.

At 408, the user is authenticated based on a comparison of the dynamic grip signature to an initial grip template. In some implementations, the initial grip template comprises a plurality of predefined vibration signals. In some implementations, the user is authenticated by determining whether the detected vibration signal features match a range of the plurality of predefined vibration signals (a.k.a. enrollment templates) in response to the mechanical vibration excitations produced by the device.

In some implementations, the initial grip template is created as the user grips the mobile device more than one time. In some implementations, the initial grip template is created during an enrollment process. In some implementations, the initial grip template is pre-stored in a repository during the enrollment process. In some implementations, the repository can be located on the mobile device, or on a remote server.

In some implementations, if it is determined that the detected vibration signal matches the range of the plurality of predefined vibration signals, the user is granted access to a subset of a function of an application that is installed on the mobile device. In some implementations, if it is determined that the detected vibration signal does not match the range of the plurality of predefined vibration signals, steps 402-406 can be repeated to a predetermined number of times, or the user is declined access to the subset of a function of the application. After 408, the method 400 ends.

In some implementations, the grip signal is used as an auxiliary and assistive biometric to aid decisions made by the primary biometric. In some implementations, this decision is not of identification but anti-spoofing utility.

Figure 5:
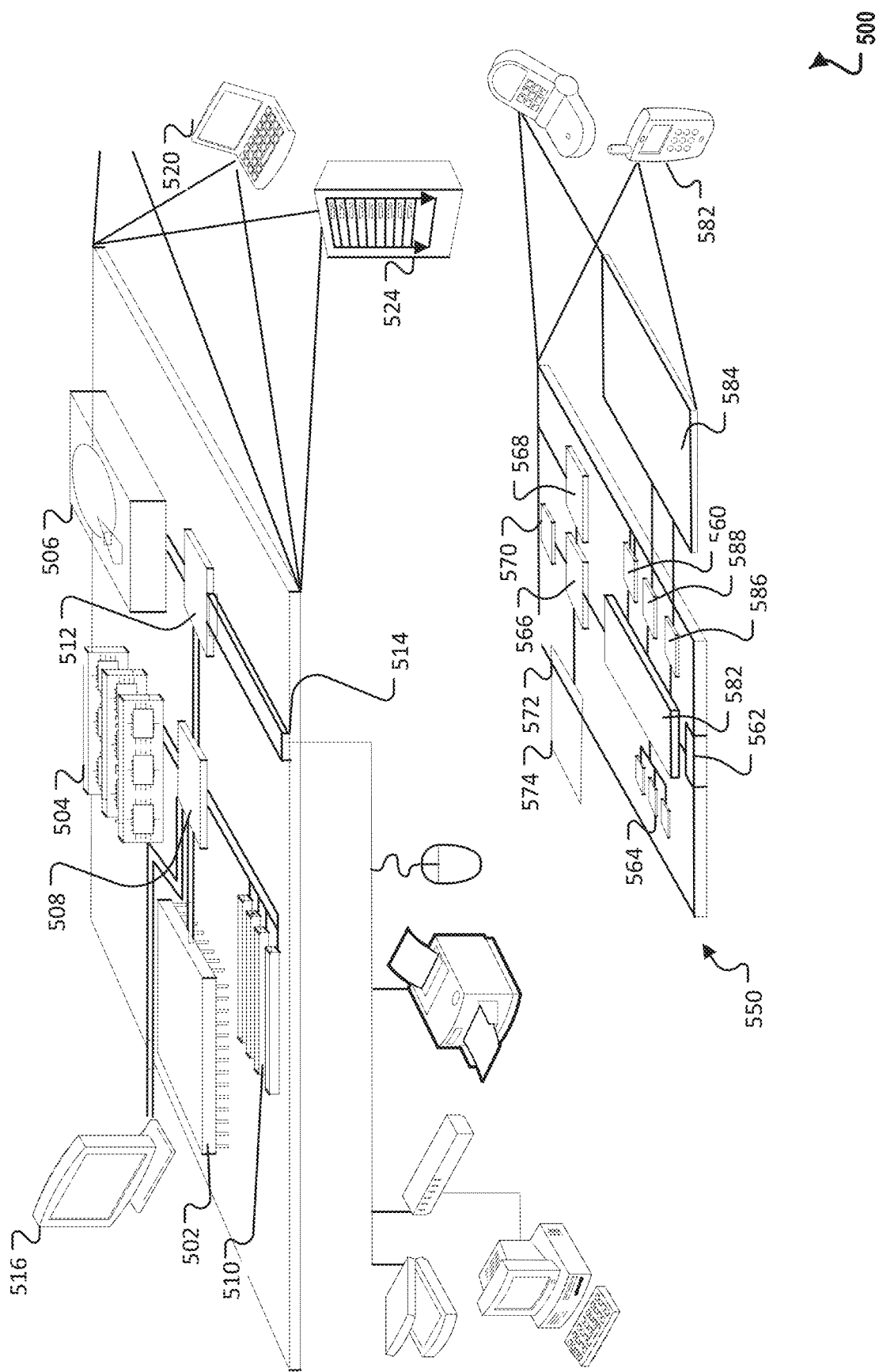
FIG. 5 is an example of a computing device and a mobile computing device that are employed to execute implementations of the present disclosure, according to some implementations of the present disclosure.

FIG. 5 is an example of a computing device 500 and a mobile computing device 550 that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory devices, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device, such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single In-Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may also include secure information. Thus, for example, the expansion memory 574 may be provided as a security module for the mobile computing device 550, and may be programmed with instructions that permits secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.), and may also include sound generated by applications operating on the mobile computing device 550.

The mobile computing device 550 may be implemented in a number of different forms, as shown in FIG. 5. For example, it may be implemented as the mobile device 100 described in FIG. 1. Other implementations may include a mobile device 582 and a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   vibrating a vibrating component of a mobile device;
   detecting a vibration signal of the mobile device as a user's grip of the mobile device changes measurably over time during an authentication procedure;
   determining a dynamic grip signature for the user based on the detected vibration signal, wherein the dynamic grip signature is associated with biomechanical properties of a hand-arm system of the user, and wherein the biomechanical properties of the hand-arm system of the user comprise a progression of grip force points as the user grips; and
   authenticating the user based on a comparison of the dynamic grip signature to an initial grip template.

2. The computer-implemented method of claim 1, wherein the vibrating component of the mobile device is vibrated by a motor of the mobile device in a predetermined way.

3. The computer-implemented method of claim 1, wherein the biomechanical properties of the hand-arm system of the user include at least one of which hands of the user first touches the mobile device as the user grips the mobile device, a plurality of points of impact on a hand of the user as the user grips, and grip patterns of the user.

4. The computer-implemented method of claim 1, wherein the initial grip template comprises a plurality of predefined vibration signals.

5. The computer-implemented method of claim 4, wherein authenticating the user comprises determining whether the detected vibration signal matches a range of the plurality of predefined vibration signals.

6. The computer-implemented method of claim 5, further comprising:
   determining that the detected vibration signal matches the range of the plurality of predefined vibration signals; and
   in response to the determining, granting access to a subset of functions of an application.

7. The computer-implemented method of claim 1, wherein the initial grip template is created as the user grips the mobile device more than once.

8. The computer-implemented method of claim 1, wherein the initial grip template is created during an enrollment process.

9. The computer-implemented method of claim 8, comprising:
   capturing, with a camera, images of the mobile device, wherein vibrations of the mobile device is determined based on distortions of the images; and
   authenticating the user based on a comparison of the images of the mobile device to initial images of the mobile device captured during the enrollment process.

10. The computer-implemented method of claim 1, wherein the initial grip template is pre-stored in a repository during an enrollment process.

11. The computer-implemented method of claim 10, wherein the repository is located on the mobile device or on a remote server.

12. The computer-implemented method of claim 1, wherein detecting the vibration signal of the mobile device comprises:
    capturing one of more images using a camera of the mobile device, and
    based on the captured one or more images, determining the vibration signal of the mobile device.

13. The computer-implemented method of claim 12, wherein the vibration signal is determined from the one or more images based on one or more of onset of motion blur, frequency of motion blur, amplitude of motion blur, and rolling shutter distortions.

14. The computer-implemented method of claim 12, wherein a direction of vibration is determined based on the captured one or more images.

15. A computer-implemented system, comprising:
    a one or more processors; and
    a computer-readable storage device coupled to the one or more processors and having instructions stored thereon which, when executed by the one or more processors, cause the one or more processors to perform operations comprising:
    vibrating a vibrating component of a mobile device;
    detecting a vibration signal of the mobile device as a user's grip of the mobile device changes measurably over time during an authentication procedure;
    determining a dynamic grip signature for the user based on the detected vibration signal, wherein the dynamic grip signature is associated with biomechanical properties of a hand-arm system of the user, and wherein the biomechanical properties of the hand-arm system of the user comprise a progression of grip force points as the user grips; and
    authenticating the user based on a comparison of the dynamic grip signature to an initial grip template.

16. The computer-implemented system of claim 15, wherein the vibrating component of the mobile device is vibrated by a motor of the mobile device in a predetermined way.

17. The computer-implemented system of claim 15, wherein the biomechanical properties of the hand-arm system of the user include at least one of which hands of the user first touches the mobile device as the user grips the mobile device, a plurality of points of impact on a hand of the user as the user grips, and grip patterns of the user.

18. The computer-implemented system of claim 15, wherein the initial grip template comprises a plurality of predefined vibration signals.

19. The computer-implemented system of claim 18, wherein authenticating the user comprises determining whether the detected vibration signal matches a range of the plurality of predefined vibration signals.

20. A non-transitory, computer-readable medium storing one or more instructions executable by a computer system to perform operations comprising:
- vibrating a vibrating component of a mobile device;
- detecting a vibration signal of the mobile device as a user's grip of the mobile device changes measurably over time during an authentication procedure;
- determining a dynamic grip signature for the user based on the detected vibration signal, wherein the dynamic grip signature is associated with biomechanical properties of a hand-arm system of the user, and wherein the biomechanical properties of the hand-arm system of the user comprise a progression of grip force points as the user grips; and
- authenticating the user based on a comparison of the dynamic grip signature to an initial grip template.

21. The non-transitory, computer-readable medium of claim 20, wherein the vibrating component of the mobile device is vibrated by a motor of the mobile device in a predetermined way.

22. The non-transitory, computer-readable medium of claim 20, wherein the biomechanical properties of the hand-arm system of the user include at least one of which hands of the user first touches the mobile device as the user grips the mobile device, a plurality of points of impact on a hand of the user as the user grips, and grip patterns of the user.

23. The non-transitory, computer-readable medium of claim 20, wherein the initial grip template comprises a plurality of predefined vibration signals.

* * * * *